(12) United States Patent
Chang et al.

(10) Patent No.: US 8,953,309 B2
(45) Date of Patent: Feb. 10, 2015

(54) ELECTRONIC DEVICE

(75) Inventors: Cheng-Mao Chang, Taipei Hsien (TW);
Ching-Piao Kuan, Taipei Hsien (TW);
Chih-Ming Kuo, Taipei Hsien (TW);
Yan-Lin Kuo, Taipei Hsien (TW)

(73) Assignee: Acer Incorporated, Taipei Hsien (TW)

( * ) Notice: Subject to any disclaimer, the term of this patent is extended or adjusted under 35 U.S.C. 154(b) by 201 days.

(21) Appl. No.: 13/616,677

(22) Filed: Sep. 14, 2012

(65) Prior Publication Data
US 2013/0225001 A1 Aug. 29, 2013

(30) Foreign Application Priority Data

Feb. 29, 2012 (TW) .............................. 101203524 A

(51) Int. Cl.
*H05K 5/00* (2006.01)
(52) U.S. Cl.
USPC ................................. 361/679.12; 361/679.21
(58) Field of Classification Search
USPC ........................................ 361/679.12, 679.21
See application file for complete search history.

(56) References Cited

U.S. PATENT DOCUMENTS

| 8,446,715 | B2* | 5/2013 | Su et al. .................. 361/679.12 |
| 2006/0108900 | A1* | 5/2006 | Lee ............................. 312/319.6 |
| 2007/0018956 | A1* | 1/2007 | Kim et al. ..................... 345/156 |
| 2007/0289099 | A1* | 12/2007 | Jung .............................. 16/354 |
| 2009/0273893 | A1* | 11/2009 | Wilson et al. ............. 361/679.12 |
| 2013/0188304 | A1* | 7/2013 | Lee .......................... 361/679.12 |
| 2013/0308263 | A1* | 11/2013 | Dondurur et al. ........ 361/679.12 |
| 2014/0015448 | A1* | 1/2014 | Wikander et al. ................ 318/3 |

* cited by examiner

*Primary Examiner* — Forrest M Phillips
(74) *Attorney, Agent, or Firm* — McClure, Qualey & Rodack, LLP

(57) ABSTRACT

An electronic device is provided, including a main body, a bottom shell, and an electrical connection port. The bottom shell is pivotally connected to the main body, and the electrical connection port is disposed on the bottom shell. When the bottom shell is in a closed position relative to the main body, the electrical connection port is covered by the main body. When the bottom shell rotates from the closed position to an opened position relative to the main body, an opening is formed between the main body and the bottom shell, and the electrical connection port is exposed to the opening.

10 Claims, 4 Drawing Sheets

ELECTRONIC DEVICE

CROSS REFERENCE TO RELATED APPLICATIONS

This Application claims priority of Taiwan Patent Application No. 101203524, filed on Feb. 29, 2012, the entirety of which is incorporated by reference herein.

BACKGROUND OF THE INVENTION

1. Field of the Invention

The application relates in general to an electronic device and in particular to an electronic device having a main body, and a bottom shell, wherein when the bottom shell rotates to an opened position relative to the main body, a connecting port is exposed therebetween.

2. Description of the Related Art

Miniaturization of notebook computers and portable electronic devices have become a design trend in recent years. The thickness of electronic devices has decreased, so that it may be smaller than the size of connection ports, which is troublesome. Additionally, the space for the connection ports may be insufficient when the thickness of the electronic devices is too thin.

BRIEF SUMMARY OF INVENTION

An embodiment of the invention provides an electronic device, comprising a main body, a bottom shell, and an electrical connection port. The bottom shell is pivotally connected to the main body, and the electrical connection port is disposed on the bottom shell. When the bottom shell is in a closed position relative to the main body, the electrical connection port is covered by the main body. When the bottom shell rotates from the closed position to an opened position relative to the main body, an opening is formed between the main body and the bottom shell, and the electrical connection port is exposed to the opening.

DETAILED DESCRIPTION OF INVENTION

Figure 1:
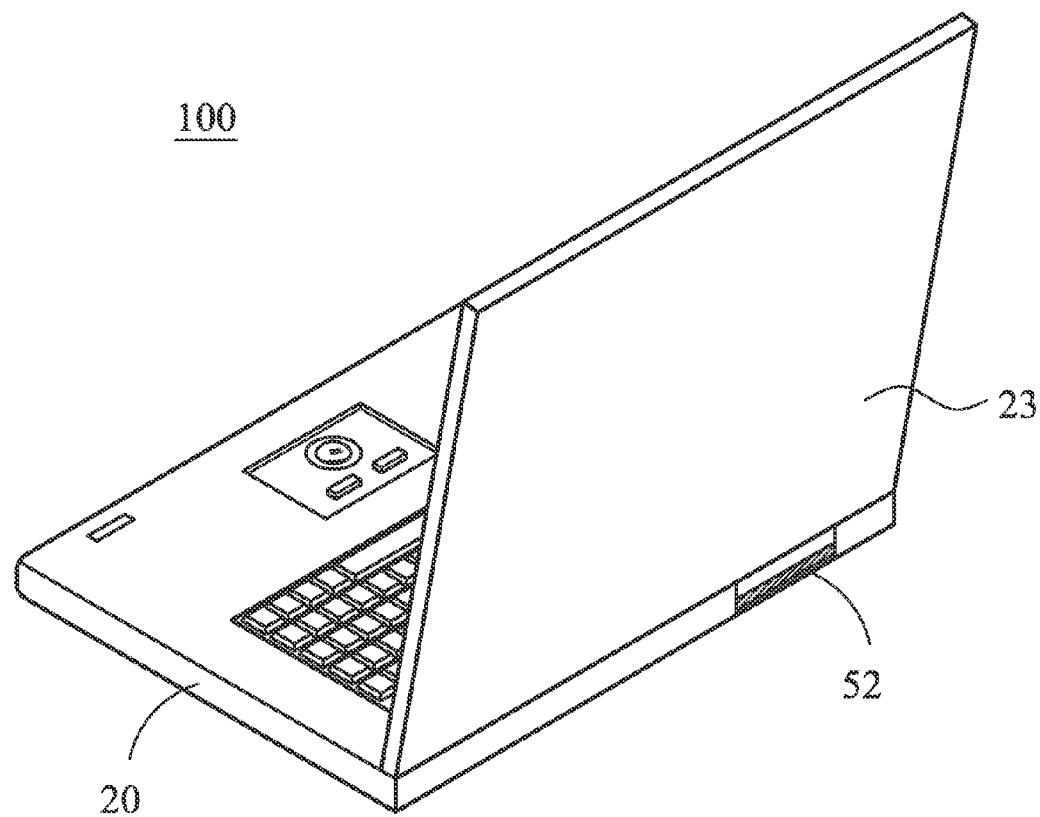
FIG. 1 is a perspective diagram of an electronic device which the bottom shell thereof is in a closed position relative to the main body according to an embodiment of the invention.
Figure 2:
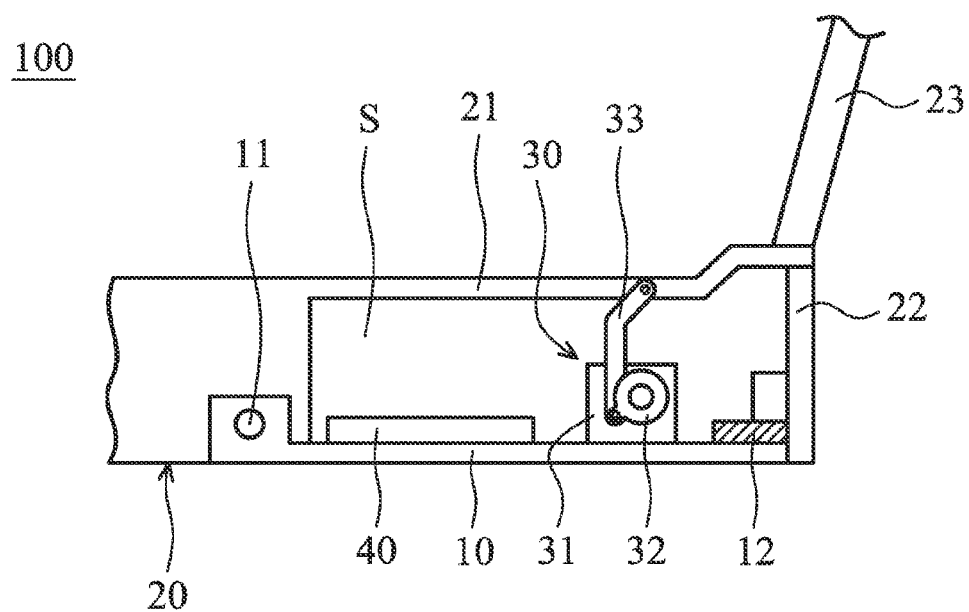
FIG. 2 is a perspective diagram of a bottom shell in a closed position relative to the main body according to an embodiment of the invention.

Referring to FIGS. 1 and 2, an embodiment of an electronic device 100, such as a notebook, primarily comprises a main body 20 and a display 23. As shown in FIG. 2, a movable bottom shell 10 is disposed under the main body 20 and pivotally connects thereto via a hinge 11. The bottom shell 10 is rotatable relative to the main body 20 in a closed position or an opened position.

As shown in FIG. 2, the main body 20 comprises a top cover 21 and a rear cover 22 connected to each other. When the bottom shell 10 is in the closed position relative to the main body 20, the bottom shell 10 is substantially parallel to a supporting surface B (such as a desktop) and the top cover 21, and the rear cover 22 is coupled with the bottom shell 10. In FIG. 2, a space S is formed between the top cover 21 and the bottom shell 10 of the main body 20 with a circuit board 40 disposed therein. An electrical connection port 12, such as a USB port, is disposed on the bottom shell 10. When the bottom shell 10 is in the closed position relative to the main body 20, the electrical connection port 12 is covered by the rear cover 22 of the main body 20.

Specifically, a driving unit 30 is disposed in the space S, wherein the driving unit 30 comprises a motor 31 disposed on the bottom shell 10, a rod 33 pivotally connected to the top cover 21 of the main body 20, and a rotary member 32 with both ends thereof respectively pivotally connected to the motor 31 and the rod 33, thus forming a multi-linkage structure. As shown in FIG. 2, when the bottom shell 10 is in the closed position relative to the main body 20, the rotary member 32 is connected to the rod 33 in a position near the bottom shell 10.

Figure 3:
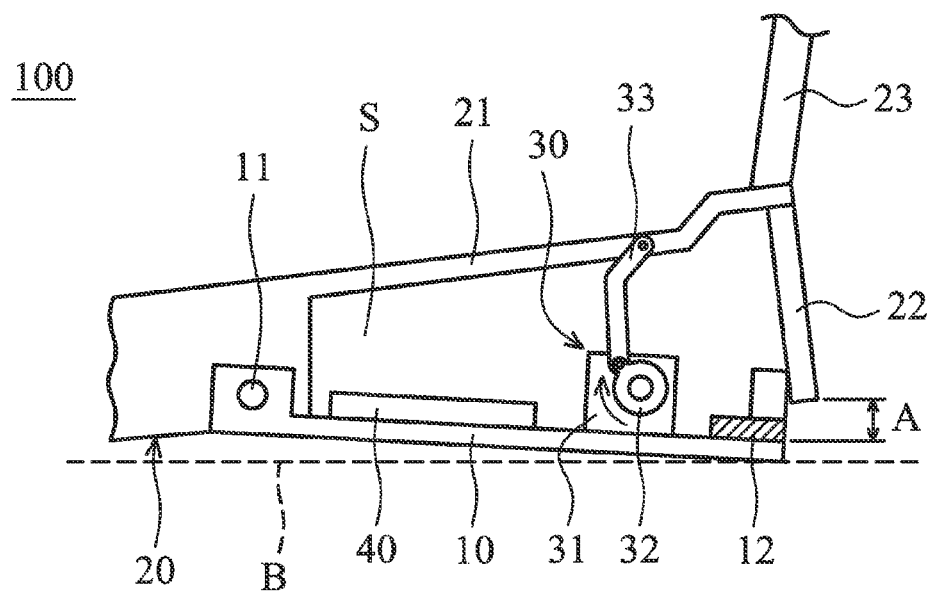
FIG. 3 is a perspective diagram of a bottom shell in an opened position relative to the main body according to an embodiment of the invention.

Referring to FIG. 3, the motor 31 of the driving unit 30 may force the rotary member 32 to rotate in the direction as the arrow indicates in FIG. 3, and the rotary member 32 drives the rod 33 to push the top cover 21 upwardly to separate from the bottom shell 10. As the bottom shell 10 rotates to the opened position relative to the main body 20, an opening A is formed between the main body 20 and the bottom shell 10, whereby the electrical connection port 12 is exposed to the opening A.

Figure 4:
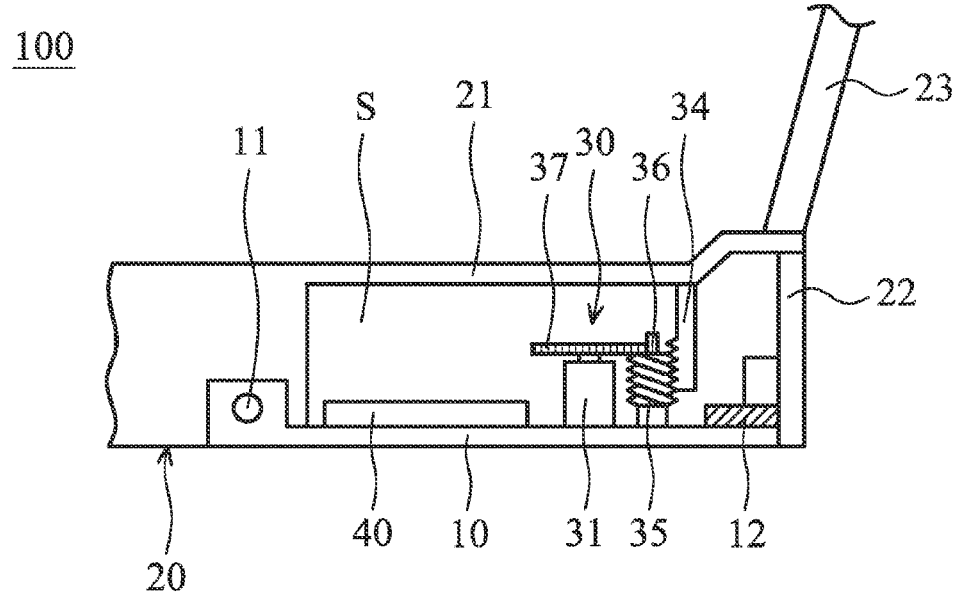
FIG. 4 is a perspective diagram of a bottom shell in a closed position relative to the main body according to another embodiment of the invention.
Figure 5:
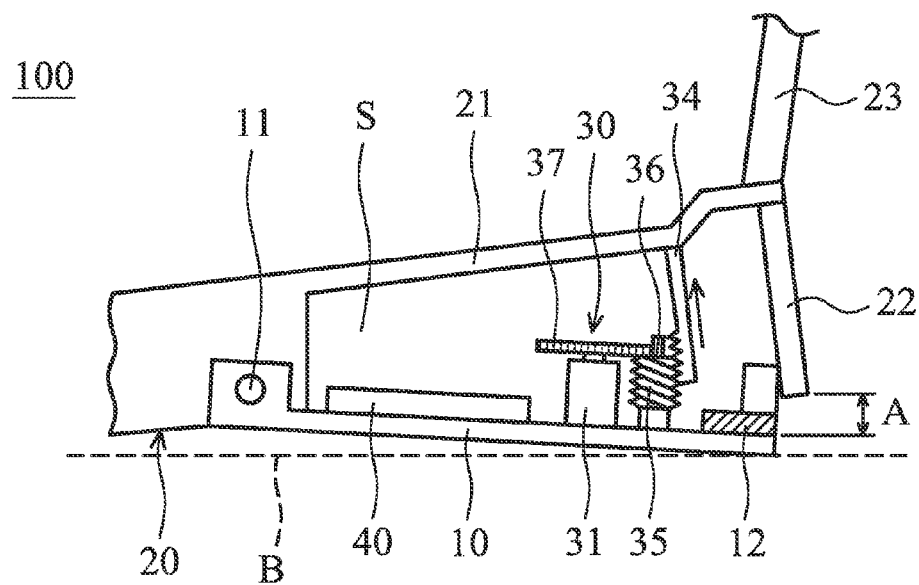
FIG. 5 is a perspective diagram of a bottom shell in an opened position relative to the main body according to another embodiment of the invention.

In another embodiment, the driving unit 30 may comprise a motor 31, a rack 34, a threaded rod 35, a first gear 36, and a second gear 37, as shown in FIGS. 4 and 5. The rack 34 is connected to the top cover 21 of the main body 20, the motor 31 and the threaded rod 35 are disposed on the bottom shell 10, and the first gear 36 and the second gear 37 are respectively connected to the threaded rod 35 and the motor 31. Additionally, the threaded rod 35 is connected to the motor 31 through the first and second gears 36 and 37 which are engaged with each other, and the rack 34 is engaged with the threaded rod 35. The motor 31 can drive the second gear 37 and the first gear 36 to rotate, such that the threaded rod 35 forces the rack 34 to straightly move along a perpendicular direction.

When the user needs to use the electrical connection port 12, the threaded rod 35 can be driven by the motor 31 of the driving unit 30, so as to drive the rack 34 to move upwardly relative to the threaded rod 35 (as the arrow indicates in FIG. 5). The bottom shell 10 therefore rotates to the opened position relative to the main body 20, wherein an opening A is formed between the main body 20 and the bottom shell 10, and the electrical connection port 12 is exposed to the opening A for convenience of usage.

Figure 6:
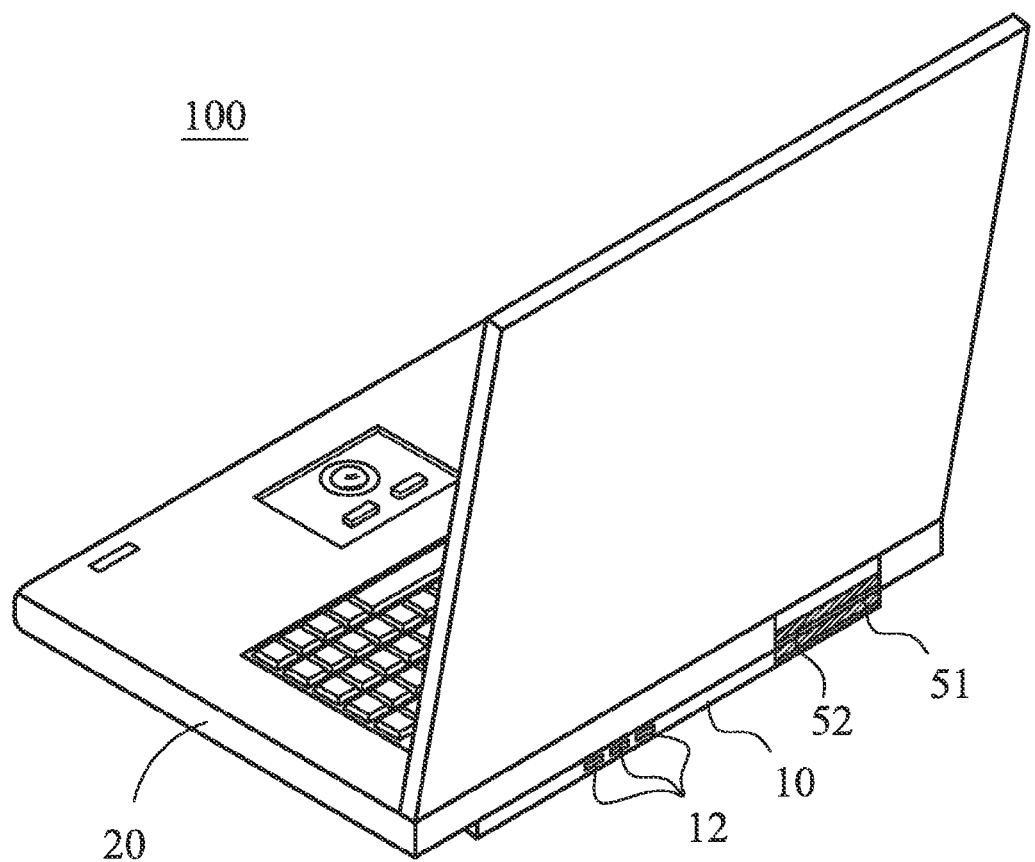
FIG. 6 is a perspective diagram of an electronic device which the bottom shell thereof is in an opened position relative to the main body according to an embodiment of the invention.

Referring to FIGS. 1 and 6, when the bottom shell 10 is in a closed position relative to the main body 20 (FIG. 1), the electrical connection port 12 on the bottom shell 10 is covered by the main body 20, and when the bottom shell 10 rotates to an opened position relative to the main body 20 (FIG. 6), the electrical connection port 12 on the bottom shell 10 is exposed to the opening A for connection to peripherals. The electronic device 100 is switched to an opened state. Specifically, a first hole 51 and a second hole 52 (FIG. 6) are formed on the bottom shell 10 and the rear cover 22, respectively, wherein hot air is exhausted from the electronic device 100 through the first and second holes 51 and 52.

In some embodiments, a sensor (not shown) may be disposed in the main body 20 of the electronic device 100. When the sensor detects that a connector (not shown) is electrically connected to the electrical connection port 12, a control circuit transmits a signal to the driving unit 30 to maintain the bottom shell 10 in the opened position relative to the main body 20, thus preventing damage of the electrical connection port 12 and the connector. In another embodiment, the control circuit may transmit different signals to the driving unit 30 according to different settings for angle adjustment between the bottom shell 10 and the main body 20.

The invention provides an electronic device, wherein a movable bottom shell is disposed on a bottom side of the main body, and an electrical connection port is disposed on the bottom shell. When the bottom shell is in a closed position relative to the main body, the electrical connection port is covered by the main body. When a driving unit in the main body drives the bottom shell to rotate to an opened position relative to the main body, an opening is formed with the electrical connection port exposed thereto. Thus, the electrical connection port can be disposed on the edge of the electronic device with convenience of usage and protection.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An electronic device, comprising:
a main body;
a display, connected to the main body;
a bottom shell, pivotally connected to the main body; and
an electrical connection port, disposed on the bottom shell, wherein when the bottom shell is in a closed position relative to the main body, the electrical connection port is covered by the main body, and when the bottom shell rotates from the closed position to an opened position relative to the main body, an opening is formed between the main body and the bottom shell, and the electrical connection port is exposed to the opening.

2. The electronic device as claimed in claim 1, wherein the electronic device further comprises a circuit board disposed between the bottom shell and the main body.

3. The electronic device as claimed in claim 1, wherein the bottom shell comprises a first hole, and the main body comprises a second hole, and air is exhausted from the electronic device through the first and second holes.

4. The electronic device as claimed in claim 1, wherein the electronic device further comprises a driving unit disposed in the main body, and the driving unit drives the bottom shell to rotate relative to the main body between the opened position and the closed position.

5. The electronic device as claimed in claim 4, wherein the driving unit comprises a motor, a rod pivotally connected to the main body, and a rotary member pivotally connecting the motor with the rod, and the rotary member is rotated by the motor to force the rod to rotate and push the main body to move along a first direction, and when the bottom shell is in the closed position, the bottom shell is parallel to a plane, and the first direction is substantially perpendicular to the plane.

6. The electronic device as claimed in claim 5, wherein the motor comprises a step motor or a servo motor.

7. The electronic device as claimed in claim 4, wherein the driving unit comprises a motor, a rack connected to the main body, and a threaded rod connecting the motor with the rack, and the threaded rod is rotated by the motor to push the rod to move along a first direction, and when the bottom shell is in the closed position, the bottom shell is parallel to a plane, and the first direction is substantially perpendicular to the plane.

8. The electronic device as claimed in claim 7, wherein the motor comprises a step motor or a servo motor.

9. The electronic device as claimed in claim 4, wherein the electronic device further comprises a control circuit and a sensor both disposed in the main body, and when the sensor detects that a connector is electrically connected to the electrical connection port, the control circuit transmits a signal to the driving unit to maintain the bottom shell in the opened position relative to the main body.

10. The electronic device as claimed in claim 9, wherein the control circuit transmits different signals to the driving unit according to different settings to adjust an angle between the bottom shell and the main body.

* * * * *